Patented Oct. 28, 1947

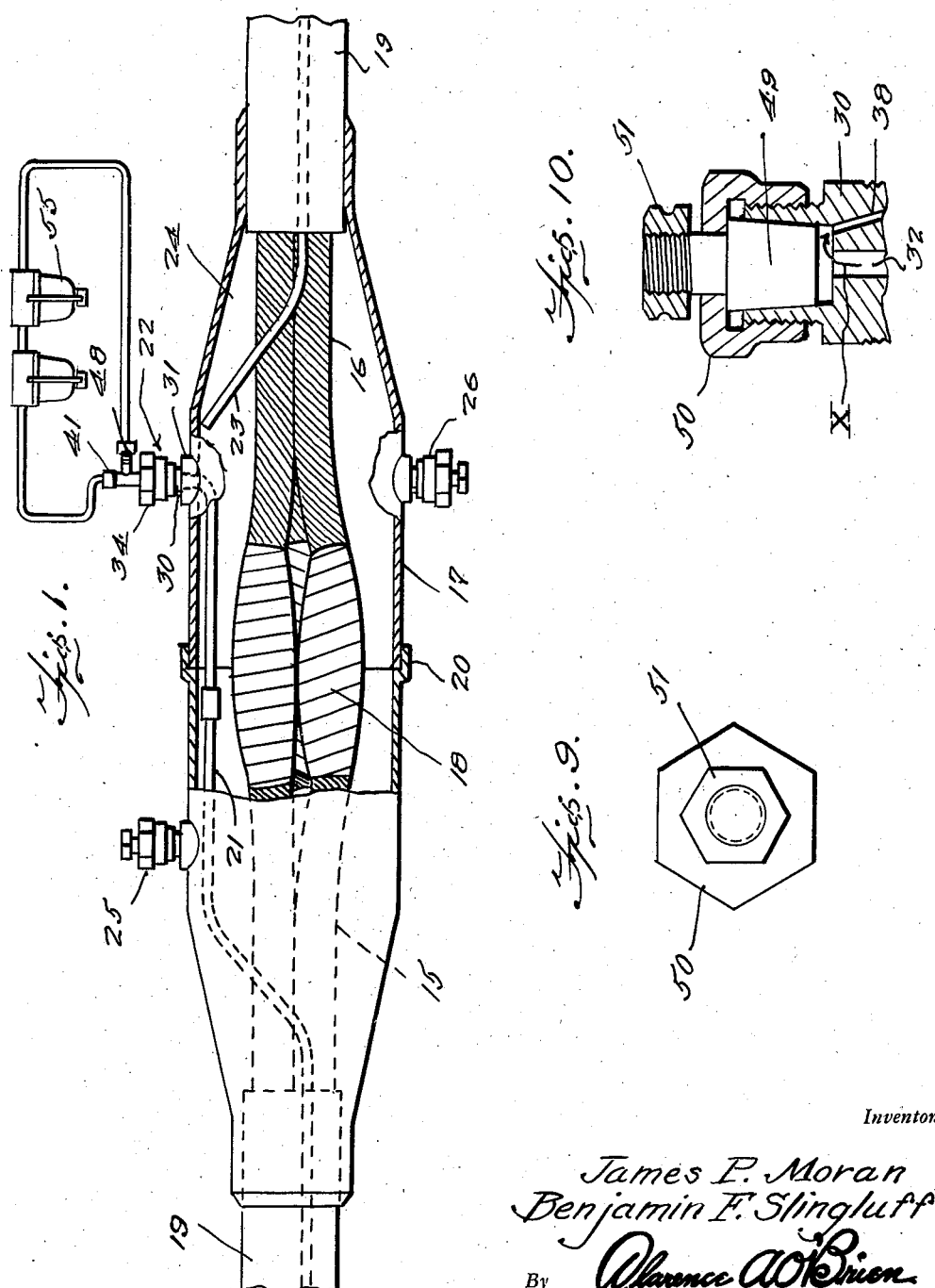

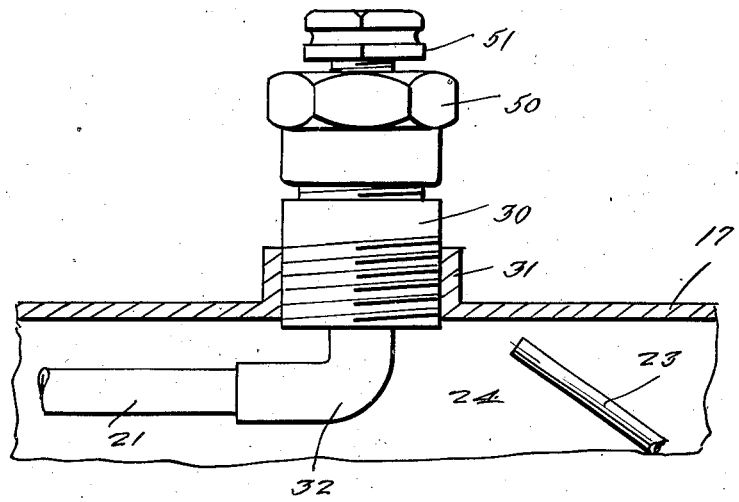

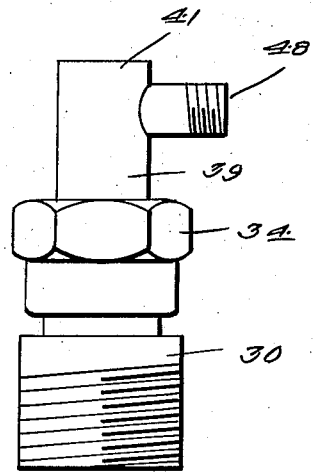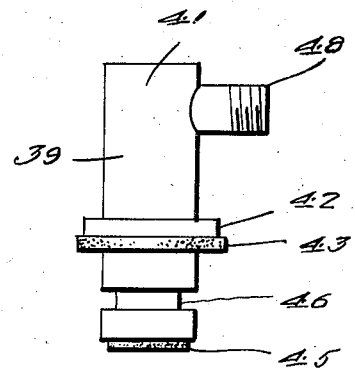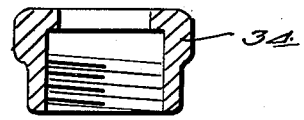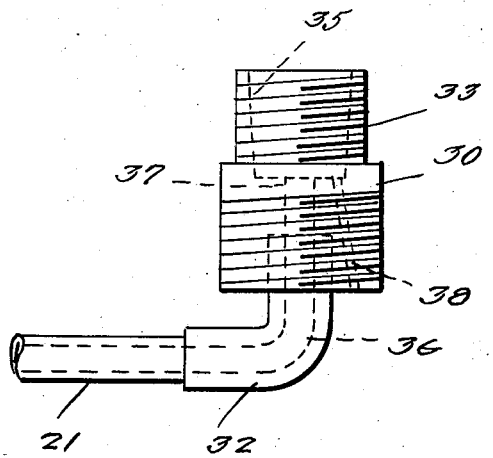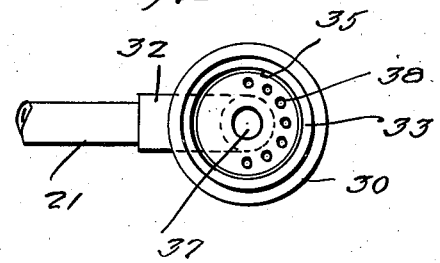

2,429,765

UNITED STATES PATENT OFFICE 2,429,765

PIPE JOINT

James P. Moran, Washington, D. C., and
Benjamin F. Slingluff, Cheverly, Md.

Application August 25, 1944, Serial No. 551,232

4 Claims. (Cl. 285—23)

The present invention appertains to a specially constructed adapter between a fluid pressure and flow measuring instrument and a metal joint connecting two cable lengths in which are imbedded one or more solid-wall, metal tubes for fluid gas or oil.

The main object of this invention is now to obviate the disadvantages found in joints of this type, in which it is necessary to have the tube ends exposed outside the joint for taking measurements of pressure and flow in such cables. By means of a special adapter or test nipple fitting suitable openings of said casing to which the instruments such as manometer, flow indicator or Bourdon gage can be attached, direct measurements can now be taken without disturbing the metal tubes at all.

In the accompanying drawings one embodiment of the invention is illustrated, wherein like numerals represent the same parts in the different views.

Figure 1 shows a connecting joint or casing between two cable lengths in elevation and part section;

Figure 2 a fragmentary section of said joint with an ordinary closing plug for normal running;

Figure 3 a similar section with the adapter also in section in position for taking the test by a manometer;

Figure 4 is a side elevation of the test adapter;

Figure 5 a similar view of the adapter nipple proper;

Figure 6 a similar view of the permanent base member of the adapter;

Figure 7 a top plan view of Figure 6;

Figure 8 a nut for the base portion and

Figure 9 and 10 top plan view and section respectively of closing cap and stop for manual operation.

In the drawings numerals 15 and 16 represent two ends of multiple cables to be joined together in the casing 17. The cables are respectively enclosed by a metal sheath 19 and 19, secured by wiped solder in the tapered ends of the casing 17. The conductors are spliced together in the middle of the casing at 18 preferably wrapped with insulation. The casing 17 is preferably made of two pieces of spun copper or lead, joined together tightly, as at 20, forming a surrounding belt. Imbedded between the cables 15, to the left of Figure 1 is shown a copper tube 21 having a solid imperforate wall which terminates within the test plug 22 provided on top of the casing 17. A similar copper tube 23 is imbedded in the opposite cables 16, but this tube terminates in the open chamber 24 in the casing 17. These tubes 21 and 23, of which there may be several, act as fluid conduits, gas or oil or other suitable liquid.

Beside the test plug at 22, there are provided two other plugs, one at 25 on top of the casing to provide for spot measurement of pressure, and the other 26 at the bottom of casing 17 serving as means for draining off excess compound of the system.

Referring particularly to Figures 3, 4, 5, 6, 7 and 8, showing the testing adapter, reference numeral 30 represent the base member of the adapter screwed into a threaded socket 31 on top of the casing. Into the threaded underside of the base 30 one threaded arm of an elbow 32 is inserted and in the bore of the other arm of the elbow 32 is sealed as by solder the end of the fluid conduit or copper tube 21. The base portion 30 extends upwardly with its threaded shank 33, adapted to receive a retaining nut 34, this shank being provided with an outwardly open conical chamber 35, between which and the central opening 36 of the elbow is furnished in the base member 30, an axial bore 37. In a semi-circle around the axial bore is provided a number of narrow channels or perforations 38, seven being shown, see Figure 7, which form permanently open connections between said space 35 and the interior chamber 24 of the casing 17.

The adapter proper or test nipple is represented by numeral 39 consisting of a substantially cylindrical body with an axial bore, 40, intended to form a continuation of the bore 37 in the base-member 30 and terminating at its upper end with a threaded socket 41 for receiving a testing instrument. About midway up on its cylindrical body, the adapter 39 is provided with an annular flange 42 between which and the top surface of the threaded shank 33 is placed a leather or rubber gasket 43, and in a recess 44 formed at the bottom of the test nipple 39 is placed another similar gasket 45, to prevent leakage of fluid passing from the copper tube 21 into the bores 37 and 40. Around the lower end of the nipple 39 is provided an annular groove 46 and finally a narrow channel 47 is shown running lengthways in the test nipple body 39 to form a continuation to the perforations 38 in the base member 30. This channel opens into the bore of the outside threaded thimble 48 extending radially from near the socket 41, but without connecting therewith.

As thus assembled the device is ready for operation by attaching the end conduits of a testing instrument 55, one to each of the fluid outlets at 41 and 48, thus causing a continuous flow of fluid to be tested, from one to the other of the imperforate tubes 21 and 23, without having to draw their ends out of the casing 17 as is necessary with present day appliances.

For normal running and continuous flow of fluid thru all imperforate metal tubes 21 and 23 in all sections of the cable line, the arrangement as shown in Figures 2, 9 and 10 is utilized. In this case the base member 30 remains inserted in the casing socket 31, but in place of parts 34, 39, 43 and 45, which have now been removed from plug 22 in the casing 17, a tapered stopper 49 is inserted in the conical space 35 of the base member 30 in order to close the fluid flow from tube 21 and the bore 32, which flow is now instead directed down thru the perforations 38, see arrow X Figure 10, back into the chamber 24 in the metal casing 17 to continue thru tube 23 and all the others in line. This stopper 49 is secured in closed position by a clamping nut 50 and is provided with an exterior head 51.

The plugs at 25 and 26 on the casing are preferably of similar construction as the one just described.

This device as already stated is adapted for testing flow of gas, oil or other fluid as well as pressure and other internal conditions of electric multiple cable lines. For this reason, sundry measuring instruments, such as a directional flow indicator, a manometer, a pressure gage or the like, denoted by numeral 55 in position in Figure 1 may be used attached to one or both of the sockets 41 and 48 on the nipple 39.

It is to be understood that the invention as here disclosed is not limited to the details here described but that the same may be varied widely without departing from the spirit of the invention as defined by the subjoined claims.

We claim:

1. An adapter for measuring fluid pressure and flow in a fluid conduit provided with a casing having a chamber for said fluid; said adapter comprising a base member secured in said casing and formed with a fluid space, supply inlet means communicating with said chamber, passage means in said base member providing intercommunication between said chamber and space, a test nipple inserted in said space and means for holding the nipple seated in said space, a test thimble extending from said test nipple and a by-pass formed in the nipple between said space and the test thimble, a test socket in said nipple and a bore from said test socket thru said nipple and said base member, and a second supply inlet means from said conduit connecting with said bore of the base member; whereby, upon a suitable testing instrument being applied with one of its terminals to said test thimble and its other terminal to said test socket, the differential in pressure between the fluid in said supply conduits will be measured.

2. An adapter for connecting the terminals of a pressure and flow testing instrument in fluid communication with the ends of the impervious fluid conduits in a fluid filled cable installation comprising a base member having a well formed therein and a plurality of passages extending therethrough, the inner ends of said passages terminating in said well and the outer ends of said passages being adapted to be placed in fluid communication with the ends of said respective fluid conduits, a removable nipple member adapted to be inserted into said well and removably secured to said base member, said nipple member having a plurality of fluid passages extending therethrough, said passages adapted to act with the fluid passages in said base member to form a plurality of separate fluid passages through said adapter, means for securing said nipple to said base member, and means provided at the outer ends of said fluid passages passing through said nipple for attaching thereto the respective ends of the terminals of said testing instrument.

3. An adapter for connecting the terminals of a pressure and flow testing instrument in fluid communication with the ends of the impervious fluid conduits in a fluid filled cable installation comprising a base member, a well formed in the upper portion of said base member, an axially aligned bore extending through said base member, fluid passages extending through said base member positioned between the outer portion thereof and said bore, the inner ends of said axially aligned bore and said fluid passages terminating in said well section, means for permanently securing the end of one of said impervious fluid conduits to the outer end of said axial bore, a nipple member adapted to have one end thereof inserted in said well portion of said base member, an axially aligned bore extending through said nipple member the inner end thereof being in alignment with the inner end of said bore in said base member when said nipple member is inserted therein, means for removably securing said nipple member in said base member for maintaining said bores in alignment, a fluid passage extending longitudinally of said nipple member positioned between said axially extending bore in said nipple member and the outer surface thereof the ends of said fluid passage terminating before reaching the ends of said nipple member, a radially extending passage in the lower end of said nipple member connecting with the lower end of said longitudinally extending passage to place the inner end thereof in fluid communication with said well portion of said base member when said nipple is inserted therein, and a second radially extending passage connecting with the other end of said longitudinally extending passage, and means provided for the outer end of said second radially extending passage and the outer end of said axially extending bore in said nipple member for securing the respective terminals of said testing instrument thereto to provide separate fluid passages from the respective ends of said impervious conduits to the respective testing instrument terminals.

4. An adapter for connecting the terminals of a pressure and flow testing instrument in fluid communication with the ends of the impervious fluid conduits in a fluid filled cable installation comprising a base member having a fluid space formed in the upper portion thereof, a plurality of passages extending through the lower portion of said base member, the inner ends of said passages terminating in said fluid space and the outer ends of said passages being adapted to be placed in fluid communication with the ends of said respective fluid conduits, a removable nipple member having an inner end and an outer end, said inner end being adapted to be inserted into said fluid space and removably secured therein, said nipple member having a plurality of fluid passages extending therethrough, the ends of said passages at the inner end of said nipple member being so formed that one of the passages in said nipple member will always be in fluid communication with the same passage in said base member and the other of said passages in said nipple member will always be in fluid communication with the other of said passages in said base member regardless of how said nipple member is turned when the inner end of said nipple member is secured in said base member, so as to provide a plurality of separate fluid passages through said adapter, means for removably securing said nipple member to said base member and means provided at the outer ends of said fluid passages passing through said nipple member for attaching thereto the respective ends of the terminals of said testing instrument.

JAMES P. MORAN.
BENJAMIN F. SLINGLUFF.

REFERENCES CITED

The following references are of record in the file of this patent:

UNITED STATES PATENTS

| Number | Name | Date |
|---|---|---|
| 324,412 | Patterson | Aug. 28, 1885 |
| 372,491 | Suanders | Nov. 1, 1887 |
| 1,133,714 | Elder | Mar. 30, 1915 |
| 1,178,999 | Fleming | Apr. 11, 1916 |
| 1,478,383 | Dodge | Dec. 25, 1923 |
| 2,261,742 | Matsumoto | Nov. 4, 1941 |
| 2,277,460 | Shanklin | Mar. 24, 1942 |
| 2,355,513 | Cox | Aug. 8, 1944 |